Nov. 3, 1959 W. A. WATHEN 2,910,932
BALE TENSION ADJUSTING MECHANISM
Filed April 26, 1955 2 Sheets-Sheet 1
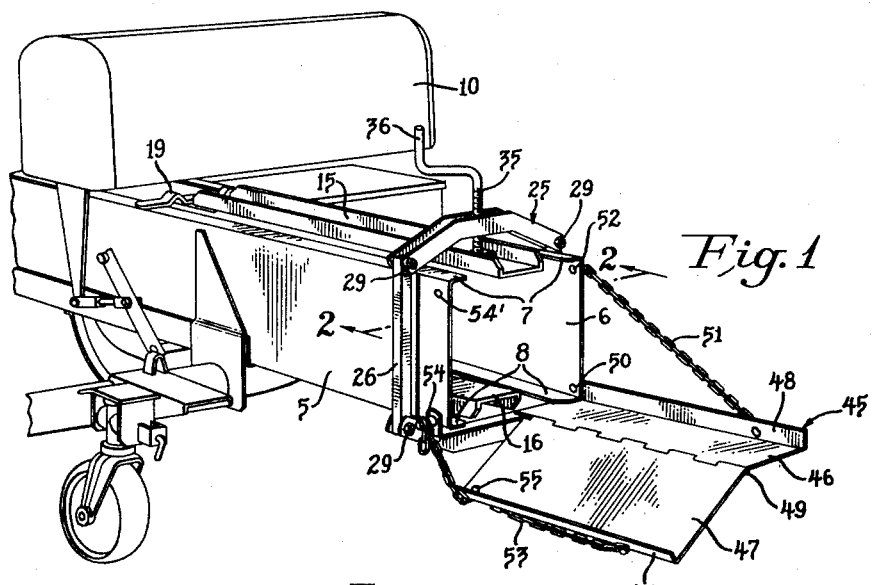
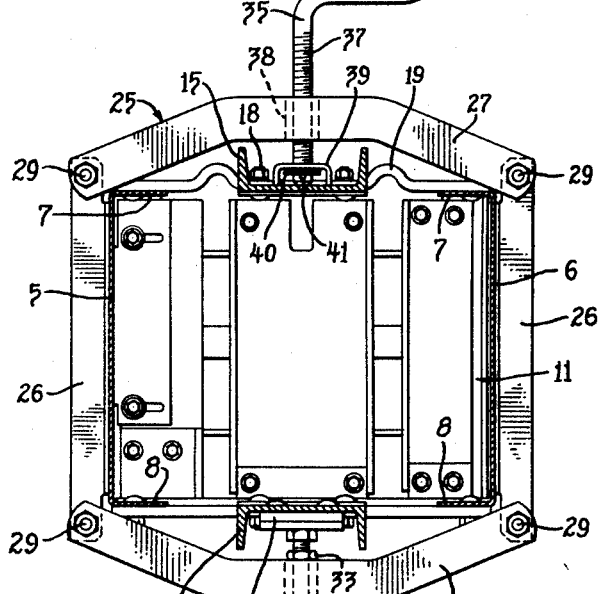
INVENTOR.
WILLIAM A. WATHEN
BY
Carlsen, Pitzner, Hubbard & Wolfe
ATTORNEYS.

Nov. 3, 1959 W. A. WATHEN 2,910,932
BALE TENSION ADJUSTING MECHANISM
Filed April 26, 1955 2 Sheets-Sheet 2

INVENTOR.
WILLIAM A. WATHEN
BY
ATTORNEYS.

United States Patent Office 2,910,932
Patented Nov. 3, 1959

2,910,932
BALE TENSION ADJUSTING MECHANISM

William A. Wathen, Detroit, Mich., assignor to Massey-Ferguson Inc., a corporation of Maryland Application April 26, 1955, Serial No. 504,083

2 Claims. (Cl. 100—191)

The invention relates to machines for compressing hay, straw and comparable material into bales and, more particularly, to improve mechanism for determining and controlling the compactness of the bales formed by the machine.

The invention is particularly useful in balers of the type in which material is compressed into bales by a plunger reciprocating in a chamber having its end wall opposite the plunger defined by a previously formed and tied bale. In such balers, the baling chamber is commonly made long enough to accommodate at least one completed bale while the next bale is being formed, and the completed bale is pushed along toward the open end or outlet of the chamber as the new bale is built up progressively to the desired length. The resistance opposed to the movement of the completed bale through the chamber thus determines the degree to which the next bale is compacted or compressed. The degree of compression determines the tension that will be exerted by the compressed material on the tying strands after the bale is discharged from the machine. Present day balers are usually equipped with some means for varying the resistance opposed to bale movement or, as it is commonly called in the art, for bale tension adjustment.

One object of the invention is to simplify the mechanism required for bale tension adjustment, to make it more dependable and rugged in construction, to provide easier and more accurate adjustment and better maintenance of the adjustment while the baler is in use, and to produce bales of uniform rectangular cross-section with square corners irrespective of the adjustment.

Other objects and advantages of the invention will become apparent from the following detailed description of the preferred embodiment illustrated in the accompanying drawings, in which Figure 1 is a fragmentary rear end perspective view of a baler equipped with bale tension adjusting mechanism embodying the features of the invention.

Fig. 2 is a transverse sectional view through the baling chamber taken in a vertical plane substantially on the line 2—2 of Fig. 1.

Figure 3:
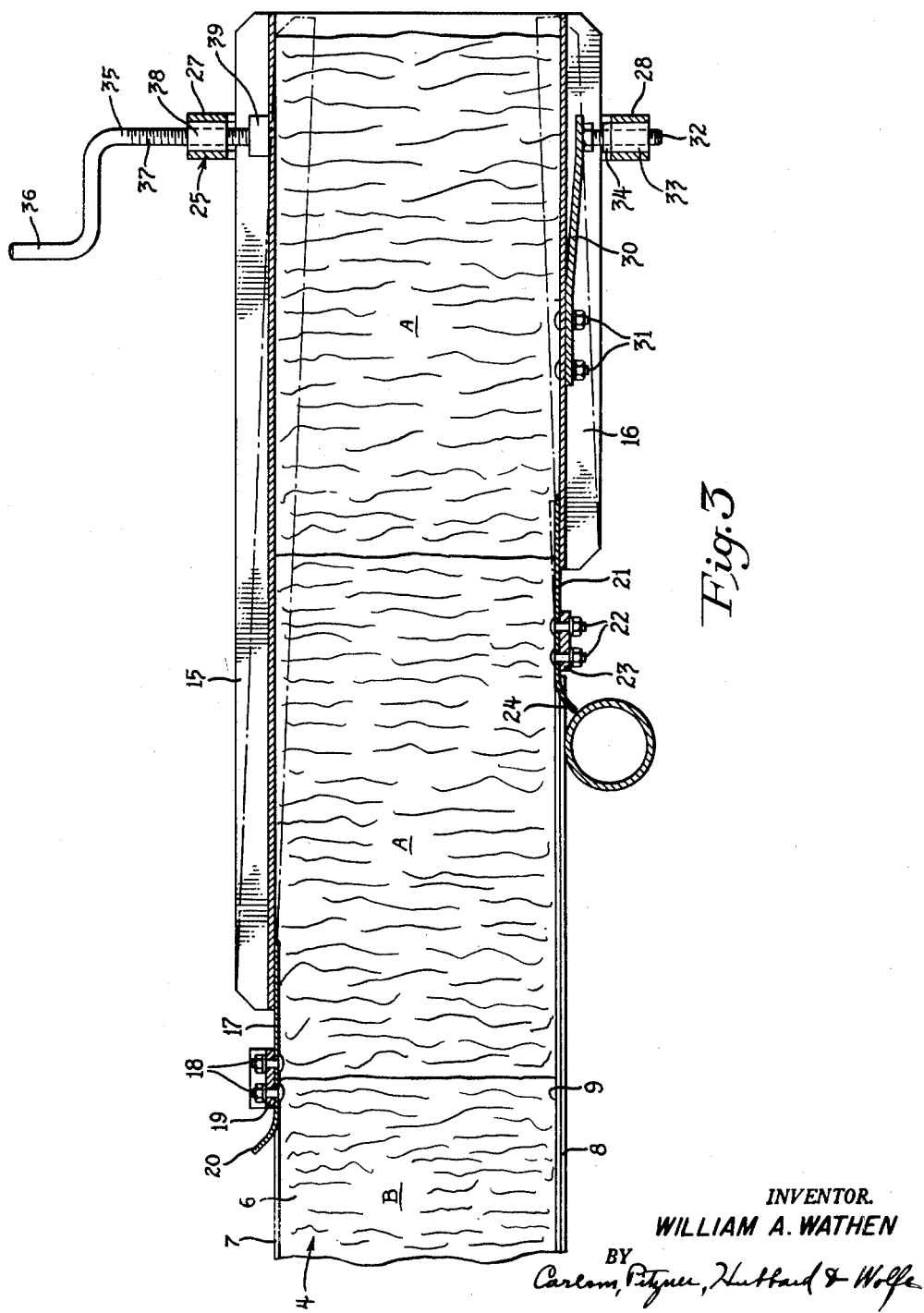
Fig. 3 is a fragmentary longitudinal sectional view through the baling chamber taken in a vertical plane substantially on the line 3—3 of Fig. 2.

While a preferred form of the invention has been shown and will be described herein, it is to be understood that there is no intention to limit the invention to the particular embodiment shown, but, on the contrary, the intention is to cover all modificaitons and adaptations falling within the spirit and scope of the invention as expressed in the appended claims.

By way of illustration, the invention has been shown as incorporated in a baler of the general type disclosed and claimed in the co-pending Noral A. Nelson et al. application, Serial No. 504,080, filed April 26, 1955, which issued as Patent No. 2,862,347. The exemplary baler has an elongated baling chamber 4 of generally rectangular cross-section defined in part by spaced, parallel side members 5 and 6. As shown, the side members are channel shaped, each having an inturned flange 7 adjacent its upper edge and a similar inturned flange 8 adjacent its lower edge, which flanges, respectively, define portions of the top and bottom walls of the chamber. Adjacent the forward end of the chamber in which the bales are formed, the bottom of the chamber is closed by a sheet metal bottom 9 and the top is partially closed by a frame structure supporting the bale tying mechanism which is enclosed in a housing 10, as shown in Fig. 1.

Material to be baled is fed into the forward portion of the baling chamber through an opening in one of the side walls and such material is compacted into a bale by a plunger 11 reciprocating longitudinally of the chamber. As will be seen by reference to Fig. 3, the chamber is made sufficiently long to accommodate at least one previously formed and tied bale A and, preferably, two or more such bales while the next bale B is being formed. The forward end of the bale A thus serves as the end wall of the chamber against which the material formed into the new bale is pressed. As the new bale is built up, the completed bale A is gradually pushed back through the chamber toward the open end and eventually discharged therefrom.

In accordance with the invention, the rear end portion of the baling chamber is constructed in a novel manner to provide simple yet efficient means for varying the resistance opposed to the passage of the bales to the chamber outlet whereby to regulate the compactness or tension of succeeding bales. For this purpose, the rear end portion of the chamber is provided with top and bottom wall defining members 15 and 16 adjustable to vary the vertical dimensions of the chamber in a plane substantially along the central axis of the chamber. Thus, the resistance to bale movement through the chamber can be adjusted without changing the overall cross-sectional dimensions of the bale or the squareness of the corners of the bales.

In the exemplary baler the top and bottom wall members 15 and 16 comprise elongated channels disposed with their flanges facing outwardly and presenting relatively wide, flat faces for sliding engagement with the top and bottom surfaces of the bales passing through the baling chamber. Both members are supported adjacent their inner or forward ends for limited pivoting movement transversely of the baling chamber. More particularly, the members are supported so that their aft ends may be shifted vertically toward or from each other so as to vary the space left between them for the passage of the bales.

Support for the upper or top wall member 15 is provided, in this instance, by a resilient strip 17 of sheet metal or other suitable material welded or otherwise rigidly attached to the wall member adjacent its end. At its other end the strip 17 is secured as by bolts 18 to a cross-bar 19 extending across and rigidly secured to the upper flanges 7 of the side wall members 5 and 6. Wall member 15 is thus enabled to swing about a pivotal axis adjacent the cross-bar 19 between a raised position in which it is shown in full lines in Fig. 3 and a lowered position, shown in broken lines. Preferably, the forward edge of the strip 17 is turned upwardly as at 20 to direct any loose or projecting material on the upper surface of the bale under the cross-bar.

The lower or bottom wall member 16 is similarly supported for vertical swinging movement. Support for the member is provided, in this instance, by a flexible strip 21 of sheet metal or the like suitably attached to the forward end of the member and anchored as by bolts 22 to a cross-bar 23 extending across and secured to the lower flanges 8 of the side wall members 5 and 6. The forward edge of the strip 21 is preferably bent downwardly as at 24 to aid in directing loose or projecting material over the cross-bar in the passage of a bale along the chamber.

To provide for adjustably positioning the top and bottom wall members 15 and 16, the baling chamber is embraced adjacent its discharge end by a rectangular frame structure 25 comprising a pair of spaced, vertically disposed side bars 26 connected together at their upper and lower ends by top and bottom yokes 27 and 28. In the preferred form shown, each of the yokes is made up of a pair of flat bars arranged to straddle the side bars and the yokes and bars are connected as by bolts 29. Preferably, each of the yokes is centrally relieved or arched away from the baling chamber to afford clearance for the flanges of the wall members 15 and 16 when the members are in their outer positions. The side bars 26, however, are shaped for abutting engagement with wall members 5 and 6 and prevent their spreading apart from the pressure exerted by the passing bales.

In accordance with the invention, the aft or free end of the bottom member 16 is yieldably supported on the lower yoke 28 by a very simple, yet efficient and rugged spring arrangement. More particularly, the support for the member is provided by a flat leaf spring 30 rigidly secured at one end to the underside of the member as by bolts 31. The spring 30 is shaped so that its free end, when unstressed, is spaced substantially below the member 16 and adapted to rest on a suitable pad or abutment carried by the yoke 28. As herein shown, the abutment comprises the head of a screw 32 threaded through a block 33 embraced between the bars forming the yoke and welded thereto. By adjusting the position of the screw the bottom wall member 16 may thus be located in selected positions between the upper position, shown in broken lines, and the lower position, shown in solid lines in Fig. 3. A stop nut 34 threaded on the screw locks it in adjusted position. It will be understood, of course, that the bottom member is depressed against the force exerted by the spring as the bales pass through the chamber, the spring thus limiting the frictional resistance opposed to the passage of the bale.

The invention also provides simple and efficient means for adjustably supporting the rear or free end of the top wall member 15 from the upper yoke 27 of the frame structure. In its preferred form, the supporting means comprises a rod 35 having an integral crank 36 at one end by which it can be turned by hand. The end portion of the rod remote from the crank is threaded as at 37 and screwed through a nut element 38 received between and welded to the two bars forming the upper yoke 27 of the frame structure.

As shown in Fig. 2, the lower end of the rod 35 projects through an apertured U-shaped bracket 39 welded or otherwise rigidly attached to the upper face of the channel member 15. The tip of the rod, which is preferably rounded, bears against the central or web portion of the member. A washer 40 held in place on the rod by a cotter pin 41 or the like, bears against the underside of the bracket to prevent withdrawal of the rod therefrom. Accordingly, when the rod is screwed upwardly, the top wall member is raised through engagement of the washer with the bracket. Conversely, when the rod is screwed downwardly, it pushes the member 15 down and provides a positive abutment for holding the member in position against the force exerted by a passing bale.

It will be evident from the foregoing that the invention provides a simple, yet rugged and very effective, means for varying the vertical dimensions of an area extending longitudinally of the baling chamber adjacent its discharge end. This spacing determines the resistance opposed to the passage of the completed bales and thus the degree to which the succeeding bales are compacted. Thus, by simply screwing one adjustment element, namely, the rod 35, up or down, the compactness of the bales or the tension which they will exert on the tying strands may be adjusted within wide limits. The turning of the rod is easily effected through the medium of the hand crank 36 provided on the rod.

It is to be noted particularly that the tension adjusting mechanism exerts pressure on a passing bale in an area extending longitudinally and substantially centrally of the bale. Thus, the square corners of the bale are effectively preserved and the cross-section of the bale remains substantially constant irrespective of the adjustment. This uniformity of dimensions along with the square corners produces bales that can be piled in firm, even stacks.

The exemplary baler is shown as equipped with a bale drop chute 45 which is readily adjustable to drop the bales either directly behind the baling chamber or to throw them to one side so as to leave a clear path for the baler on its next round. For this purpose the chute 45 is made up of two leaves or sections 46 and 47 longitudinally hinged together substantially at the center of the chute. As shown in Fig. 1, each of the sections comprises a bed portion with an upstanding flange 48 along its outer edge. The adjacent inner section edges are secured together, in this instance, by a hinge 49.

When the chute is assembled within the baler, one of the sections, in this instance the section 46, has its flange 48 attached to the baler side wall member 6 by a pin 50 permitting pivotal movement about a horizontal axis transversely of the baling chamber. A flexible tension element, such as a chain 51, connected between a hook or the pin 52 on the wall member 6, and the flange 48 adjacent its rear end, supports the section 46 with its bed portion substantially alined with the bottom wall of the baling chamber.

The other chute section 47 is free to swing between a position coplanar with the section 46 and a position in which it is folded back against the underside of the companion section. The position of the section 47 is determined by a flexible tension member or chain 53 attached at one end to a hook or pin 54 adapted to be received in suitable holes 54' respectively provided in the chamber side wall member 5 adjacent its upper and lower edges. The chain 53 is permanently connected to the flange 48 of the section 47 adjacent the rear end of that section so that the latter may be positioned in coplanar alinement with the section 46 by inserting the pin 54 in the upper hole of the wall member. Alternatively, the pin may be moved to the lower hole and one of the intermediate links of the chain temporarily hooked over a pin 55 provided adjacent the outer forward edge of the section 47 to hold the section in a selected tilted position. As another alternative, the section 47 may be folded back under the section 46 and retained in that position by hooking the chain 53 to the pin 52 which serves to anchor the pin 51 in place. The position of the section 47 thus not only determines the direction in which the bale is discharged from the chute but also the particular side on which the bale comes to rest on the ground.

For transport, the two sections of the chute 45 are preferably brought into alinement and folded upwardly close to the end of the baling chamber. The sections are held in the transport position by hooking selected links of the chains 51 and 53 over the respective anchoring pins 52 and 54, the latter, of course, being in the upper hole in the side wall member.

I claim as my invention:

1. In a baler, in combination, side, top and bottom wall members defining an elongated chamber of generally rectangular cross-section through which bales are pushed toward an outlet as an incident to the formation of succeeding bales, said side wall members being disposed in parallel relationship throughout their entire length, cross members extending between and secured to the upper and lower edges of said side wall members and spaced substantially from the outlet end of the chamber, said top and bottom members terminating rearwardly of said cross members, resilient elements supporting the adjacent ends of said top and bottom wall members on the respective cross members for movement toward and from each other so as to vary the effective cross-sectional area of the chamber, a frame embracing the chamber adjacent its outlet end, said frame comprising side bars connected at their upper and lower ends by yokes, a leaf spring anchored at one end to the chamber bottom wall member a substantial distance forwardly of said frame and having its free end extending over the lower yoke, a vertically adjustable stop element on said lower yoke engageable with the free end of said spring to support the bottom wall member, and an adjusting screw threaded through a nut carried by the upper yoke and coacting with said top wall member to adjustably position that member and thereby determine the effective vertical dimension at the outlet end of the chamber.

2. In a baler, means including a pair of laterally spaced side wall members defining an elongated baling chamber of generally rectangular cross-section through which bales are pushed toward an outlet adjacent one end of the chamber as an incident to the formation of succeeding bales, a pair of elongated channel shaped members disposed between said side wall members and respectively defining the top and bottom walls of said chamber adjacent its outlet end, cross members extending between and secured to the upper and lower edges of said side wall members, a resilient strip anchored to each cross member and to the inner end of the adjacent channel member to support the same, a frame embracing the chamber forming members adjacent the outlet end of the chamber including side bars connected at their upper and lower ends by yokes, a leaf spring carried by the lower channel member cooperating with the lower yoke to yieldably support the free end of the member, and adjustable supporting means on the upper yoke of said frame having a connection with the upper channel member effective to shift it up or down to vary the vertical spacing between the top and bottom channel members, said leaf spring yielding in the passage of a bale between the members to limit the resistance opposed to its passage.

References Cited in the file of this patent
UNITED STATES PATENTS

| | | |
|---|---|---|
| 354,304 | Coleman | Dec. 14, 1886 |
| 376,688 | Trabue | Jan. 17, 1888 |
| 2,396,720 | Nolt | Mar. 19, 1946 |
| 2,718,189 | Bornzin | Sept. 20, 1955 |